United States Patent
Semmer

(10) Patent No.: US 8,916,984 B2
(45) Date of Patent: Dec. 23, 2014

(54) WIND TURBINE

(75) Inventor: Silvio Semmer, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/611,121

(22) Filed: Sep. 12, 2012

(65) Prior Publication Data

US 2013/0241207 A1  Sep. 19, 2013

(30) Foreign Application Priority Data

Sep. 15, 2011 (EP) ..................................... 11181346

(51) Int. Cl.
*F03D 1/00* (2006.01)
*F03D 9/00* (2006.01)
*F03D 11/00* (2006.01)

(52) U.S. Cl.
CPC ........ *F03D 1/00* (2013.01); *F03D 9/002* (2013.01); *F03D 11/00* (2013.01); *Y02E 10/725* (2013.01); *F03D 11/0066* (2013.01); *Y02E 10/722* (2013.01)
USPC ............................................ 290/44; 310/179

(58) Field of Classification Search
USPC ....................................... 290/44, 55
See application file for complete search history.

(56) References Cited

U.S. PATENT DOCUMENTS

| | | | |
|---|---|---|---|
| 6,373,160 B1 | 4/2002 | Schrodl | |
| 6,452,287 B1 | 9/2002 | Looker | |
| 7,075,206 B1 * | 7/2006 | Chen | 310/179 |
| 2002/0079772 A1 * | 6/2002 | Oohashi et al. | 310/184 |
| 2006/0103137 A1 | 5/2006 | Wobben | |
| 2006/0152014 A1 | 7/2006 | Bagepalli | |
| 2009/0102314 A1 * | 4/2009 | Miyata et al. | 310/257 |
| 2009/0212568 A1 * | 8/2009 | Maibach et al. | 290/44 |
| 2009/0302608 A1 * | 12/2009 | Andresen | 290/44 |

FOREIGN PATENT DOCUMENTS

| | | |
|---|---|---|
| DE | 10208588 A1 | 9/2003 |
| EP | 0093615 A1 | 11/1983 |
| EP | 0577980 A1 | 1/1994 |
| EP | 2143941 A1 | 1/2010 |
| JP | 2004064928 A | 2/2004 |
| JP | 2006238539 A | 9/2006 |
| WO | WO 9322822 A1 | 11/1993 |

OTHER PUBLICATIONS

Wikipedia; "Liste Der Offshore-Windparks"; pp. 1-10; DE; Aug. 11, 2014.

* cited by examiner

*Primary Examiner* — Tulsidas C Patel
*Assistant Examiner* — Sean Gugger

(57) ABSTRACT

A wind turbine including at least one generator is disclosed. The generator includes a stator with two sets of stator windings. The first set of stator windings is connected to a first electrical converter unit by a first cable connection and the second set of stator windings is connected to a second electrical converter unit by a second cable connection. The first cable connection is guided from the respective set of stator windings in the region of the side facing the drive end of the wind turbine and the second cable connection is guided from the respective set of stator windings in the region of the side facing the non-drive end of the wind turbine.

7 Claims, 3 Drawing Sheets

WIND TURBINE

CROSS REFERENCE TO RELATED APPLICATIONS

This application claims priority of European Patent Office application No. 11181346.5 EP filed Sep. 15, 2011. All of the applications are incorporated by reference herein in their entirety.

FIELD OF INVENTION

The disclosure relates to a wind turbine, particularly a direct drive wind turbine, comprising at least one generator, the generator having a stator with two sets of stator windings, whereby the first set of stator windings is connected to a first electrical converter unit by means of a first cable connection and the second set of stator windings is connected to a second electrical converter unit by means of a second cable connection.

BACKGROUND OF INVENTION

It is known to have generators with two sets of stator windings, i.e. two winding systems and two electrical converter units in parallel for wind turbine applications, particularly for offshore wind turbine applications. Hence, if one electrical converter unit fails, the respective generator is still able to be operated by means of the remaining, still working electrical converter unit with half of the power output.

According to a concrete generator configuration, the respective sets of stator windings or winding systems are both connected to a respective bus bar system allocated to the non-drive end of the generator. Thereby, the respective sets of stator windings are accommodated within respective stator slots of the stator, whereby each stator slot accommodates only stator windings of either the first or second set of stator windings.

SUMMARY OF INVENTION

This approach requires a comparatively large space in the region of the non-drive end of the wind turbine.

Thus, it is the object of the present disclosure to provide a wind turbine with an improved required space for its electrical components.

This is achieved by a wind turbine as described before, wherein the first cable connection is guided off the respective set of stator windings in the region of the side facing the drive end of the wind turbine and the second cable connection is guided off the respective set of stator windings in the region of the side facing the non-drive end of the wind turbine.

In comparison to prior art, the present disclosure is based on the idea to guide the respective connecting cables, which each may comprise a number of separate cables, allocated to the respective sets of stator windings off both sides of the stator. Accordingly, the first cable connection is guided off the respective set of stator windings in the region of the side facing the drive end of the wind turbine, whereas the second cable connection is guided off the respective set of stator windings in the region of the side facing the non-drive end of the wind turbine. In such a manner, the first and second cable connection is guided off the respective stator windings at axially different positions (cf. centre axis of the stator) leading to a constructively more compact design since the cable connections and the electrical converter units are provided with more space. In other words, the respective cable connections are guided off both axially opposing sides of the stator or the respective sets of stator windings, with one side facing the drive end and the other or opposing side facing the non-drive end of the wind turbine.

The drive end of the wind turbine refers to the side of the generator or stator respectively connected to the rotor hub, whereas the non-drive end of the wind turbine refers to the side of the generator connected to respective non-rotating components within the nacelle of the wind turbine. Hence, rotating components of the wind turbine, such as the rotor of the generator for instance, are generally at least indirectly connected to the drive end, whereas non-rotating components of the wind turbine, such as the stator for instance, are generally at least indirectly connected to the non-drive end of the wind turbine.

In this context, the term stator relates to the entire stator construction, so that respective stator casings or the like may also be addressed by the term stator.

The respective electrical converter units may be disposed at the non-drive end of the wind turbine, i. e. downstream to the generator. In exceptional cases it is also thinkable that at least one of the electrical converter units is disposed at the drive end of the wind turbine.

Thereby, it is possible that a first and/or second cable connection is axially guided off the respective set of stator windings or is radially guided off the respective set of stator windings in close proximity to the sets of stator windings. Hence, the respective cable connections may differ or equal in their respective directions/orientations in which they extend off the respective sets of stator windings. Hereby, axially refers to all orientations of the cable connections being essentially parallel to the centre axis of the stator, whereby respective inclined or angled orientations with respect to the centre axis of the stator are also incorporated by the term axially. Accordingly, radially refers to all orientations of the cable connections being essentially perpendicular to the centre axis of the stator, whereby respective inclined or angled orientations with respect to a vertical axis perpendicular to the centre axis of the stator are also incorporated by the term radially.

The aforementioned annotations essentially relate to the portion of the respective cable connections directly extending off the respective sets of stator windings, i. e. the further course of the respective cable connections may be different. Thus, a respective first portion of a respective cable connection may axially extend off a respective set of stator windings, a second portion downstream to the first portion of the respective cable connection may extend in a radial direction, a third portion downstream to the second portion of the respective cable connection may extend in axial direction, etc.

The stator, i.e. the stator stack may comprise respective radial bores, radial channels or the like in order to radially guide the respective cable connections off the respective set of stator windings.

It is possible that the respective cable connection being guided off the respective set of stator windings in the region of the side facing the drive end of the wind turbine is further guided towards the non-drive end of the wind turbine along the stator back core of the stator. In this embodiment, the respective cable connection being guided off the respective set of stator windings at the side facing the drive end of the wind turbine is further guided towards the non-drive end of the wind turbine along the stator back core. The stator back core may be provided with appropriate guiding means in the shape of brackets, fasteners, grooves or the like providing a firm attachment of the cable connection at the stator back core.

In an embodiment both the first and second set of stator windings are commonly disposed in respective stator slots of the stator. Thus, in case of failure of one of the respective electrical converter units, the disclosed principle allows a more even circumferentially distribution of the magnetic forces originating from the stator windings. Hence, in this case the magnetic field in the air gap would appear like either electrical converter units or sets of stator windings respectively were still being operated with only half of the power.

It is possible that the first set of stator windings is disposed at a radial outer position in comparison to the second set of stator windings or vice versa. Generally, all respective stator slots have the same configuration, i. e. with the first set of stator windings having an outer radial position in comparison to the second set of stator windings or vice versa. Yet, it is feasible that the stator slots may have different configurations, i. e. a first stator slot has the first set of stator windings in a radial outer position in comparison to the second set of stator windings, whereas a second, particularly circumferentially abutting, stator slot, has the second set of stator windings in a radial outer position in comparison the first set of stator windings.

Each set of stator windings may comprise at least two stator windings in a series connection. The number of the respective stator windings allocated to a respective set of stator windings is an integer. For an embodiment of a generator in the shape of a three phase electrical machine, it is favoured that each set of stator windings comprises at least two, particularly three stator windings, in a series connection. Each of the respective sets of stator windings conducts alternating current of the same amplitude, yet with a phase difference. The phase difference may be 120° concerning the embodiment of a generator having three respective sets of stator windings for instance.

The present wind turbine may be an offshore wind turbine. Hence, the wind turbine is ready to be installed on the sea. Of course, the wind turbine may also be installed on other sites as well.

BRIEF DESCRIPTION OF THE DRAWINGS

In the following, the embodiments are described in detail as reference is made to the figures, whereby.

DETAILED DESCRIPTION OF INVENTION

Figure 1:
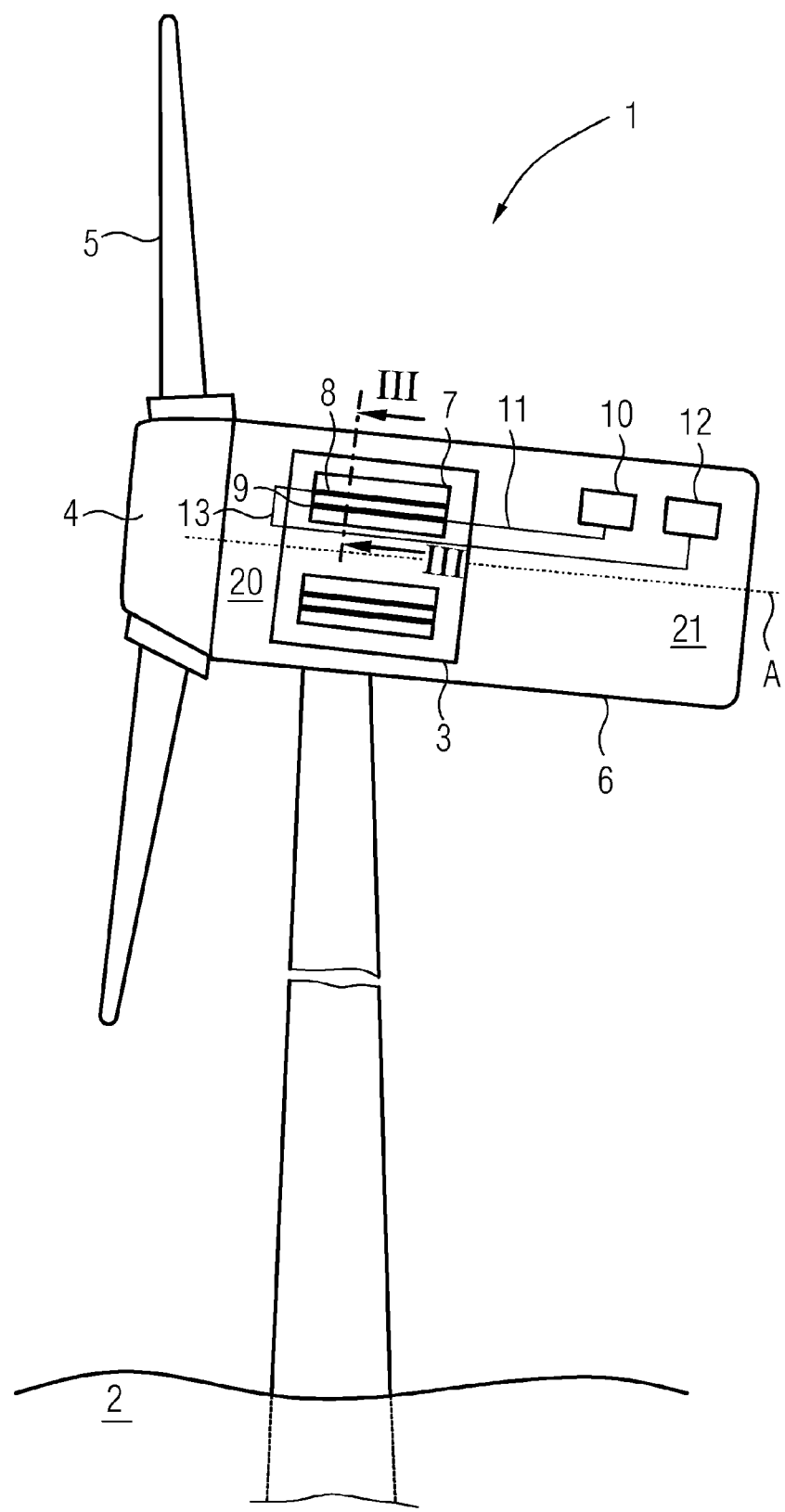
FIG. 1 shows a principle view of a wind turbine according to an embodiment.

FIG. 1 shows a principle view of a wind turbine 1 according to an embodiment. The wind turbine 1 is a direct drive wind turbine used for offshore applications; i. e. the wind turbine 1 is installed on the sea 2. The wind turbine 1 comprises a generator 3 being directly connected to a rotor hub 4 having a number of rotor blades 5 attached thereto. I. e., the wind turbine 1 can be divided in a drive end 20, i.e. the left side of the generator 3 essentially relating to all components being at least indirectly coupled to the rotor hub 4 and a non-drive end 21, i. e. the right side of the generator 3 essentially relating to all components being at least indirectly coupled to respective non-rotating components of the wind turbine 1 such as stationary components within the nacelle 6 of the wind turbine 1.

The generator 3 has a rotor (not shown) and a stator 7 with the rotor being rotatably supported relative to the stator 7. The stator 7 comprises two sets of stator windings 8, 9, whereby the first set of stator windings 8 is connected to a first electrical converter unit 10 by means of a first cable connection 11 and the second set of stator windings 9 is connected to a second electrical converter unit 12 by means of a second cable connection 13. Both cable connections 11, 13 comprise at least three different cables 14, 15, 16, 17, 18, 19 since the generator 3 is built as a three phase electrical machine, i. e. each set of stator windings 8, 9 comprises three stator windings in a series connection with each stator winding is connected to a respective cable 14, 15, 16, 17, 18, 19 (cf. FIGS. 2-4). Thereby, the respective cables 14-16 are allocated to cable connection 11, whereas the cables 17-19 are allocated to cable connection 13.

As is also discernible from FIG. 1, the respective cable connections 11, 13 are guided off the respective sets of stator windings 8, 9 at axially different positions. Cable connection 13 is axially guided off the respective set of stator windings 8 on the left side, i. e. in the region of the side facing the drive end 20 of the wind turbine 1. Cable connection 11 is axially guided off the respective set of stator windings 9 on the right side, i. e. in the region of the side facing the non-drive end 21 of the wind turbine 1.

Both cable connections 11, 13 are guided to respective electrical converter units 10, 13 disposed in the nacelle 6. Both electrical converter units 10, 13 are disposed at the non-drive end 21 of the wind turbine 1. Hence, cable connection 13 is further guided towards the non-drive end 21 of the wind turbine 1 along the stator back core of the stator 7, i. e. partially parallel to the centre axis A of the generator 3 or stator 7 respectively.

Figure 2:
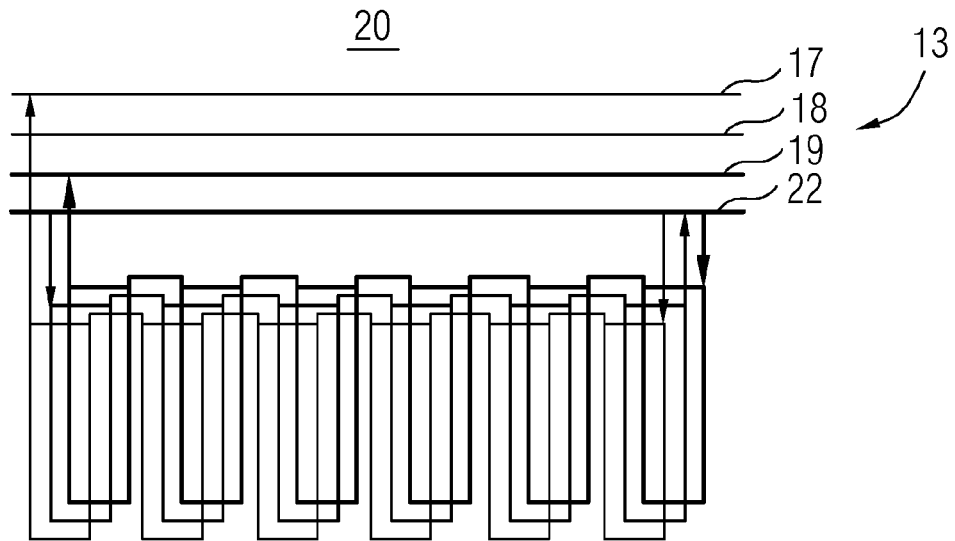
FIG. 2 shows a principle view of a coil diagram of the stator of the generator of the drive end of the wind turbine of FIG. 1.
Figure 3:
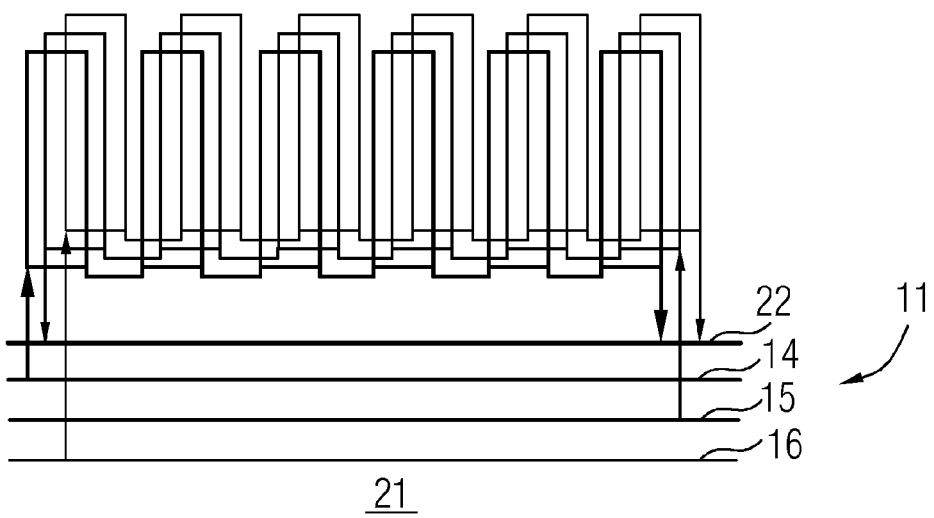
FIG. 3 shows a principle view of a coil diagram of the stator of the generator of the non-drive end of the wind turbine of FIG. 1.
Figure 4:
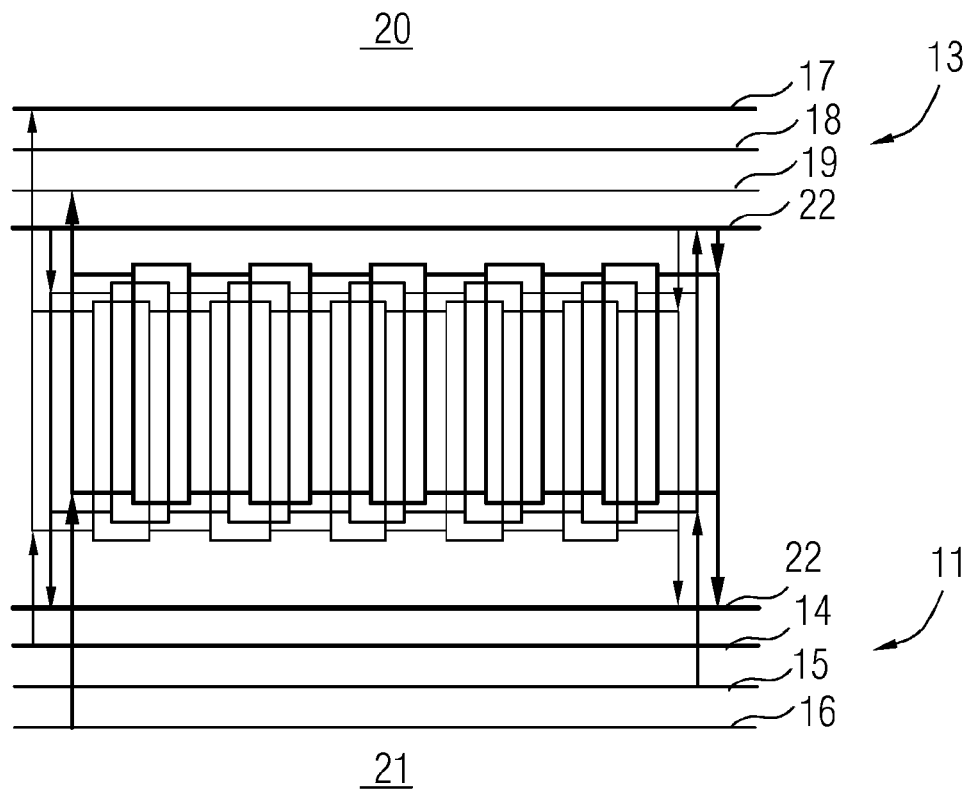
FIG. 4 shows a combined view of FIGS. 2 and 3.

Aspects of the inventive principle may be further explained when considering FIG. 2-4. Thereby, FIG. 2 shows a principle view of a coil diagram of the of the stator 7 of the generator 3 of the drive end 20 of the wind turbine 1 and FIG. 3 shows a principle view of a coil diagram of the of the stator 7 of the generator 3 of the non-drive end 20 of the wind turbine 1. FIG. 4 shows a combined view of FIGS. 2 and 3.

As is discernible, the respective cables 14-16 being allocated to cable connection 11 are guided off the respective set of stator windings 8 in direction of the non-drive end 21 of the wind turbine 1, whereas the respective cables 17-19 being allocated to cable connection 13 are guided off the respective set of stator windings 9 in direction of the drive end 20 of the wind turbine 1. Cable 22 denotes the neutral conductor.

Figure 5:
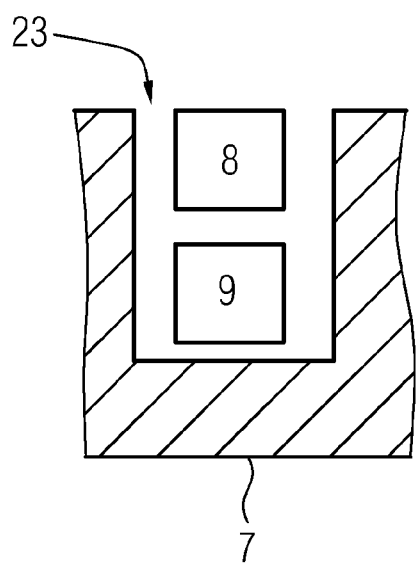
FIG. 5 shows a principle view of a stator slot of the stator of the generator of the wind turbine of FIG. 1.

FIG. 5 shows a principle view of a representative stator slot 22 of the stator 7 of the generator 3 of the wind turbine 1 of FIG. 1. Thus, FIG. 3 shows a cut view along the lines III-III in FIG. 1. As is discernible, stator slot 23 accommodates both respective sets of stator windings 8, 9. In other words, the first and second set of stator windings 8, 9 are both commonly disposed in respective stator slots 23 of the stator 7. Thereby, the respective sets of stator windings 8, 9 have different radial positions; i. e. the set of stator windings 8 has a radially outer position in comparison to the set of stator windings 9. This configuration allows a more even distribution of the magnetic forces originating from the respective sets of stator windings 8, 9 even when one of the respective electrical converter units 10, 12 fails.

In contrast to the embodiment shown in FIG. 1, it is theoretically also possible to radially guide one of the cable connections 11, 13 off the respective sets of stator windings 8, 9 in close proximity to the respective sets of stator windings 8, 9. In this case, the respective cable connections 11, 13 would be orientated in radially inward direction towards the centre axis A, i. e. the stator 7 is provided with respective radial bores, radial channels, radial apertures, or the like in this case.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A direct drive wind turbine, comprising:
   a first electric converter unit;
   a second electrical converter unit;
   a generator comprising a stator including a plurality of slots and two sets of stator windings, each of the plurality of slots includes the two sets of stator windings such that one of the two set of stator windings is disposed at a radial outer position in comparison to the other of the two sets of stator windings,
   a frist of the two sets of stator winding is connected to the first electrical converter unit by a first cable connection and a second of the two sets of stator windings is connected to the second electrical converter unit by a second cable connection,
   wherein the first cable connection is guided off the first of the two sets of stator windings in the region of the side facing the drive end of the direct drive wind turbine and the second cable connection is guided off the second of the two sets of stator windings in the region of the side facing the non-drive end of the wind turbine,
   wherein the first cable connection comprises a cable for each phase of the first of the two sets of stator windings, and
   wherein the second cable connection comprises a cable for each phase of the second of the two sets of stator windings.

2. The direct drive wind turbine according to claim 1, wherein at least the first or the second cable connection is axially guided off the respective set of stator windings in close proximity to the respective set of stator windings.

3. The direct drive wind turbine according to claim 1, wherein at least the first or the second cable connection is radially guided off the respective set of stator windings in close proximity to the respective set of stator windings.

4. The direct drive wind turbine according to claim 1, wherein the first cable connection, which is guided off the first set of stator windings in the region of the side facing the drive end of the wind turbine, is further guided towards the non-drive end of the wind turbine along the stator back core of the stator.

5. The direct drive wind turbine according to claim 1, wherein in the two sets of stator windings are commonly disposed in respective stator slots of the stator.

6. The direct drive wind turbine according to claim 1, wherein each set of stator windings comprises at least two stator windings in a series connection.

7. The direct drive wind turbine according to claim 1, wherein the wind turbine is an offshore wind turbine.

* * * * *